(12) United States Patent
Ono

(10) Patent No.: US 9,988,516 B2
(45) Date of Patent: Jun. 5, 2018

(54) RUBBER COMPOSITION AND PNEUMATIC TIRE

(71) Applicant: SUMITOMO RUBBER INDUSTRIES, LTD., Kobe-shi, Hyogo (JP)

(72) Inventor: Shuichiro Ono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 300 days.

(21) Appl. No.: 14/860,096

(22) Filed: Sep. 21, 2015

(65) Prior Publication Data

US 2016/0096948 A1 Apr. 7, 2016

(30) Foreign Application Priority Data

Oct. 6, 2014 (JP) ................. 2014-205526

(51) Int. Cl.
| | |
|---|---|
| C08K 3/36 | (2006.01) |
| B60C 1/00 | (2006.01) |
| C08K 5/17 | (2006.01) |
| C08L 9/06 | (2006.01) |
| C08C 19/00 | (2006.01) |
| C08C 19/28 | (2006.01) |

(52) U.S. Cl.
CPC ............ *C08K 3/36* (2013.01); *B60C 1/00* (2013.01); *B60C 1/0016* (2013.01); *B60C 1/0025* (2013.01); *C08C 19/00* (2013.01); *C08C 19/28* (2013.01); *C08K 5/17* (2013.01); *C08L 9/06* (2013.01)

(58) Field of Classification Search
CPC ..................... C08K 3/36; C08K 5/17
See application file for complete search history.

(56) References Cited

U.S. PATENT DOCUMENTS

| | | | | |
|---|---|---|---|---|
| 3,676,396 A | * | 7/1972 | Wakefield ............... | C08K 5/17 524/252 |
| 4,616,068 A | * | 10/1986 | Schloman, Jr. .......... | C08L 7/00 525/332.5 |
| 6,211,278 B1 | | 4/2001 | Vanel | |
| 6,294,624 B1 | | 9/2001 | Inoue et al. | |
| 6,365,668 B1 | | 4/2002 | Scholl et al. | |
| 2012/0085473 A1 | | 4/2012 | Matsuo et al. | |
| 2012/0149818 A1 | * | 6/2012 | Araujo Da Silva .. | B60C 1/0016 524/252 |

FOREIGN PATENT DOCUMENTS

| | | |
|---|---|---|
| EP | 1 000 971 A1 | 5/2000 |
| JP | 2000-344955 A | 12/2000 |
| JP | 2004-339287 A | 12/2004 |
| JP | 2013-177539 A | 9/2013 |
| RU | 2 214 427 C2 | 10/2003 |
| RU | 2011 148 589 A | 6/2013 |

* cited by examiner

*Primary Examiner* — Peter D. Mulcahy
(74) *Attorney, Agent, or Firm* — Birch, Stewart, Kolasch & Birch, LLP

(57) ABSTRACT

An object of the present invention is to provide a rubber composition which can further improve abrasion resistance without deterioration in energy efficiency, and a pneumatic tire using the rubber composition. The rubber composition comprises a polymer mixture obtained by modifying a polymer composed of at least one of a conjugated diene compound and an aromatic vinyl compound with a compound having at least one of an ester group and a carboxyl group; at least one of triamines; and silica, the polymer mixture having a weight-average molecular weight of $1.0 \times 10^3$ to $1.0 \times 10^5$, and the triamines being a compound represented by the following formula (I):

$$\begin{array}{c} R^A \\ \diagdown \\ N - ALK^1 - N - ALK^2 - N \\ \diagup \quad\quad | \quad\quad\quad\quad \diagdown \\ R^B \quad\quad R^C \quad\quad\quad\quad R^E \end{array} \quad\quad (I)$$

with $R^D$ on the upper right of the rightmost N.

wherein each of $R^A$, $R^B$, $R^C$, $R^D$ and $R^E$ independently represents a hydrogen atom or an alkyl group, and each of $ALK^1$ and $ALK^2$ independently represents an alkylene group.

10 Claims, No Drawings

RUBBER COMPOSITION AND PNEUMATIC TIRE

TECHNICAL FIELD

The present invention relates to a rubber composition and a pneumatic tire using the rubber composition.

BACKGROUND OF THE INVENTION

For resource saving, energy saving, and environmental protection, the society increasingly demands reduction in carbon dioxide gas emission. In order to also reduce the carbon dioxide gas emission of cars, various measures have been considered, including car weight reduction and the use of electric energy.

A common challenge in the automotive field is the need to enhance fuel efficiency by improving rolling resistance of tires, and there are also increasing demands for enhanced safety during driving and enhanced durability. Since these properties greatly depend on the performance of tires, tires for cars are increasingly required to have improved fuel efficiency, wet grip performance, handling stability, and durability (e.g. abrasion resistance). The performance of tires depends on various factors, including the structure and materials of tires, and greatly depends particularly on the performance of the rubber composition used in the tread part which comes into contact with the road surface. For this reason, a wide range of studies have been undertaken to technically improve rubber compositions for tires such as for treads and these techniques have been put into practical use.

For improving fuel efficiency and wet grip performance of rubber compositions, silica is widely used as a reinforcing filler but it has less reinforcing property compared to that of carbon black and there is a problem that durability such as abrasion resistance is deteriorated. In order to solve such problem, for example, JP2000-344955 A discloses a technique of using a modified butadiene as a rubber component in a rubber composition comprising silica and JP2013-177539 A discloses a technique of using a modified styrene-butadiene copolymer as a component constituting a rubber composition. However, a further improvement of the performance is required.

SUMMARY OF THE INVENTION

Problem to be Solved by the Invention

An object of the present invention is to provide a rubber composition which, in the case where silica is used as a reinforcing filler, can further improve abrasion resistance without deterioration in fuel efficiency, and to provide a pneumatic tire using the rubber composition.

Means to Solve the Problem

The present inventors have conducted extensive studies and found that a rubber composition comprising a predetermined polymer mixture, which is obtained by modifying a polymer composed of at least one of a conjugated diene compound and an aromatic vinyl compound with a compound having at least one of an ester group and a carboxyl group, and silica, to which composition at least one of predetermined triamines are further blended, can solve the above problem. As a result of further studies, the present inventors have completed the present invention.

Namely, the present invention relates to:
[1] a rubber composition comprising: a polymer mixture obtained by modifying a polymer composed of at least one of a conjugated diene compound and an aromatic vinyl compound with a compound having at least one of an ester group and a carboxyl group; at least one of triamines; and silica, the polymer mixture having a weight-average molecular weight of $1.0\times10^3$ to $1.0\times10^5$, preferably $2.0\times10^3$ to $1.0\times10^4$, more preferably $4.0\times10^3$ to $6.0\times10^3$, and the triamines being a compound represented by the following formula (I):

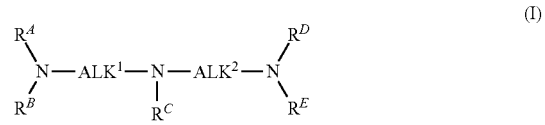

wherein each of $R^A$, $R^B$, $R^C$, $R^D$ and $R^E$ independently represents a hydrogen atom or an alkyl group, and each of $ALK^1$ and $ALK^2$ independently represents an alkylene group;
[2] the rubber composition described in the above [1], wherein the polymer mixture comprises a modified polymer in which a main chain is modified;
[3] the rubber composition described in the above [1] or [2], wherein a content of the polymer mixture is 0.5 to 100 parts by mass, preferably 3 to 100 parts by mass, more preferably 10 to 25 parts by mass, and a content of silica is 5 to 150 parts by mass, preferably 15 to 100 parts by mass, more preferably 30 to 75 parts by mass, based on 100 parts by mass of a rubber component;
[4] the rubber composition described in any of the above [1] to [3], wherein the polymer mixture comprises a modified polymer having a modified group represented by the following formula (1):

wherein A represents a single bond or a divalent saturated or unsaturated hydrocarbon group; $R^1$ represents $OR^4$ or a group represented by the following formula (2); and $R^4$ represents a hydrogen atom or a monovalent saturated or unsaturated hydrocarbon group, the formula (2) being:

wherein B represents a divalent saturated or unsaturated hydrocarbon group; and $R^5$ represents a hydrogen atom or a monovalent saturated or unsaturated hydrocarbon group;
[5] the rubber composition described in the above [4], wherein the A is represented by the following formula (3):

wherein m represents an integer of 0 to 6; and each of $R^2$ and $R^3$ independently represents a hydrogen atom, a $C_{1-2}$ hydrocarbon group, or an aryl group, and
the B is represented by any of the following formulas (4) to (7):

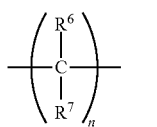  (4)

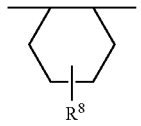  (5)

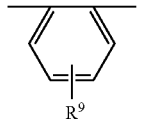  (6)

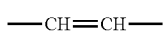  (7)

wherein n represents an integer of 2 or 3; each of $R^6$ and $R^7$ independently represents a hydrogen atom or a $C_{1-18}$ hydrocarbon group; $R^8$ represents a hydrogen atom or a methyl group; and $R^9$ represents a hydrogen atom or a $C_{1-4}$ hydrocarbon group;
[6] the rubber composition described in any of the above [1] to [5], wherein the polymer mixture comprises a modified group of not less than 0.1 group on average per molecule of a polymer constituting the polymer mixture;
[7] the rubber composition described in any of the above [1] to [6], wherein the polymer in the polymer mixture is a styrene polymer, a butadiene polymer or a styrene-butadiene polymer;
[8] the rubber composition described in the above [7], wherein the styrene-butadiene polymer has a styrene content of 5 to 45% by mass, preferably 10 to 35% by mass;
[9] a rubber composition for tires composed of the rubber composition described in any of the above [1] to [8]; and
[10] a pneumatic tire formed from the rubber composition described in any of the above [1] to [9].

Effects of the Invention

The present invention can provide a rubber composition, in particular a rubber composition for tires which, in the case where silica is used as a reinforcing filler, can further improve abrasion resistance without deterioration in fuel efficiency. The present invention can further provide a pneumatic tire using the rubber composition.

EMBODIMENT FOR CARRYING OUT THE INVENTION

<Rubber Composition>
A rubber composition of the present invention is a rubber composition comprising a polymer mixture obtained by modifying a polymer composed of at least one of a conjugated diene compound and an aromatic vinyl compound with a compound having at least one of an ester group and a carboxyl group; at least one of triamines; and silica, the polymer mixture having a weight-average molecular weight of $1.0 \times 10^3$ to $1.0 \times 10^5$, and the triamines being a compound represented by the following formula (I):

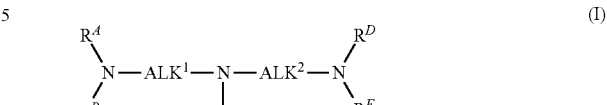  (I)

wherein each of $R^A$, $R^B$, $R^C$, $R^D$ and $R^E$ independently represents a hydrogen atom or an alkyl group, and each of $ALK^1$ and $ALK^2$ independently represents an alkylene group.

(Polymer Mixture)
The above polymer mixture is obtained by reacting a part or all of a polymer composed of at least one of a conjugated diene compound and an aromatic vinyl compound with a compound having at least one of an ester group and a carboxyl group (modifying agent). The polymer mixture contains modified polymers which are the reaction product with the modifying agent, and optionally an unmodified polymer which has not been reacted with the modifying agent. The polymer mixture has a predetermined weight-average molecular weight.

A copolymer composed of a conjugated diene compound and an aromatic vinyl compound is preferable as the above polymer composed of at least one of a conjugated diene compound and an aromatic vinyl compound, since satisfactory energy efficiency and abrasion resistance can be obtained.

Examples of the conjugated diene compound include 1,3-butadiene, isoprene, 1,3-pentadiene, 2,3-dimethylbutadiene, 2-phenyl-1,3-butadiene, 1,3-hexadiene and the like. These may be used alone or in combination of two or more. Among these, from a practical point of view, such as for easy availability of monomer, 1,3-butadiene and isoprene are preferable and 1,3-butadiene is more preferable.

Examples of the aromatic vinyl compound include styrene, α-methylstyrene, 1-vinylnaphthalene, 3-vinyltoluene, ethylvinylbenzene, divinylbenzene, 4-cyclohexylstyrene, 2,4,6-trimethylstyrene and the like. These may be used alone or in combination of two or more. Among these, styrene is especially preferable from a practical point of view, such as for easy availability of monomer.

The above polymer mixture can be produced by reacting a part or all of a terminal or a main chain of a polymer, which is obtained by polymerizing at least one of a conjugated diene compound and an aromatic vinyl compound, with the above modifying agent. The specific production method is as follows for example.

A method for polymerizing at least one of a conjugated diene compound and an aromatic vinyl compound is not limited particularly and may be polymerized by any conventionally known method. A specific example thereof is a method in which at least one of a conjugated diene compound and an aromatic vinyl compound are subjected to anionic polymerization in an organic solvent inert to a reaction, for example, a hydrocarbon solvent such as an aliphatic, alicyclic, or aromatic hydrocarbon compound in the presence of an organolithium compound as a polymerization initiator and optionally a randomizer.

The hydrocarbon solvent is not limited particularly but a $C_{3-8}$ hydrocarbon is preferable and examples thereof include propane, n-butane, isobutane, n-pentane, isopentane, n-hexane, cyclohexane, propene, 1-butene, isobutene, trans- 2-butene, cis-2-butene, 1-pentene, 2-pentene, 1-hexene, 2-hexene, benzene, toluene, xylene ethylbenzene and the like.

The ones having a $C_{2-20}$ alkyl group are preferable as the organolithium compound and examples thereof include ethyllithium, n-propyllithium, isopropyllithium, n-butyllithium, sec-butyllithium, tert-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, a reaction product of diisopropenylbenzene and butyllithium and the like. Among these, in view of easy availability, safety and the like, n-butyllithium or sec-butyllithium is preferable.

The above randomizer refers to a compound functioning to control a microstructure of a conjugated diene part of a copolymer (e.g. the increase of 1,2-linkage of butadiene) and the compositional distribution of monomer units in a copolymer (e.g. randomization of the butadiene units or styrene units in a butadiene-styrene copolymer). The randomizer is not limited particularly and may be any conventionally known compound that is generally used as a randomizer. Examples thereof include ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, 1,2-dipiperidinoethane and the like. Besides, potassium salts such as potassium-t-amylate, potassium-t-butoxide and the like, and sodium salts such as sodium-t-amylate and the like may also be used.

The used amount of the randomizer is preferably not less than 0.01 molar equivalent, more preferably not less than 0.05 molar equivalent, per mole of a polymerization initiator. If the used amount of the randomizer is less than 0.01 molar equivalent, there is a tendency that an effect by adding the randomizer is small and the randomizer hardly effects randomization. On the other hand, the used amount of the randomizer is preferably not more than 1,000 molar equivalents, more preferably not more than 500 molar equivalents, per mole of a polymerization initiator. If the used amount of the randomizer is more than 1,000 molar equivalents, there is a tendency that a reaction rate of monomers greatly changes and the randomizer hardly effects randomization in reverse.

The polymerization method is not limited particularly, and any of a solution polymerization method, a gas phase polymerization method and a bulk polymerization method may be used. In particular, a solution polymerization method is preferable in view of the freedom of a polymer design, processability and the like. Moreover, the polymerization may be performed either batchwise or continuously.

In the case of a solution polymerization method, a monomer concentration in a solution (sum of the conjugated diene compound and the aromatic vinyl compound) is preferably not less than 5% by mass, more preferably not less than 10% by mass. If the monomer concentration in the solution is less than 5% by mass, the obtained amount of the copolymer tends to be small and the cost tends to increase. On the other hand, the monomer concentration in the solution is preferably not more than 50% by mass, more preferably not more than 30% by mass. If the monomer concentration in the solution is more than 50% by mass, the solution tends to have an excessively high viscosity and to be difficult to stir and polymerize.

Then, the polymer obtained in the above is modified with a compound (modifying agent) having at least one of an ester group and a carboxyl group to obtain a polymer mixture.

In the compound having at least one of an ester group and a carboxyl group, the ester group refers to a group represented by —O—C(=O)—R or —C(=O)—O—R (R: a monovalent saturated or unsaturated hydrocarbon group), and the carboxyl group refers to a group represented by —C(=O)—O—H.

The modifying agent is not limited particularly as long as it is a compound having at least one of an ester group and a carboxyl group as a functional group and examples thereof include methyl bromoacetate, ethyl bromoacetate, i-propyl bromoacetate, t-butyl bromoacetate, benzyl bromoacetate, butyl 2-methylbromoacetate, t-butyl 2-methylbromoacetate, ethyl 2,2-dimethylbromoacetate, t-butyl 2,2-dimethylbromoacetate, ethyl 2-diethylbromoacetate, methyl 2-phenylbromoacetate, methyl 3-bromopropanoate, ethyl 3-bromopropanoate, methyl 2-methyl-3-bromopropanoate, methyl 4-bromobutanoate, ethyl 4-bromobutanoate, methyl 2-methyl-4-chlorobutanoate, ethyl 6-bromohexanoate, ethyl 5-bromopentanoate, methyl cyanoformate, methyl chloroformate, ethyl chloroformate, i-propyl chloroformate, i-butyl chloroformate, t-butyl chloroformate, pentyl chloroformate, hexyl chloroformate, heptyl chloroformate, octyl chloroformate, decyl chloroformate, dodecyl chloroformate, hexadecyl chloroformate, phenyl chloroformate, benzyl chloroformate, succinic anhydride, butylsuccinic anhydride, 1,2-cyclohexanedicarboxylic anhydride, decylsuccinic anhydride, dodecylsuccinic anhydride, hexadecylsuccinic anhydride, 4-methylcyclohexane-1,2-dicarboxylic anhydride, octadecylsuccinic anhydride, n-octylsuccinic anhydride, n-tetradecylsuccinic anhydride, glutaric anhydride, 1,1-cyclopentanediacetic anhydride, 3,3-dimethylglutaric anhydride, 2,2-dimethylglutaric anhydride, 3-methylglutaric anhydride, 4-tert-butylphthalic anhydride, 4-methylphthalic anhydride, 3-methylphthalic anhydride, t-butyl acrylate, methyl acrylate, ethyl acrylate, maleic anhydride, acrylic acid, methacrylic acid, itaconic acid, oxalic acid, malonic acid, succinic acid, glutaric acid, adipic acid, azelaic acid, sebacic acid, maleic acid, fumaric acid, citraconic acid and the like. Among these, t-butyl acrylate, methyl cyanoformate, 4-methylcyclohexane-1,2-dicarboxylic anhydride and maleic anhydride are preferable.

The method for modification with the above compound is not limited particularly and may include a method of bringing the above polymer and the above compound into contact with each other. For example, a part or all of the terminal of a polymer can be modified by adding a predetermined modifying agent to a solution of a terminally active polymer produced by the above-mentioned anionic polymerization and stirring the mixture at a predetermined temperature for a predetermined time. Alternatively, a part or all of the terminal of a polymer can be modified, after adding a predetermined reaction terminator to a solution of a terminally active polymer produced by the above-mentioned anionic polymerization to temporarily terminate the reaction to obtain a polymer, by again treating the mixture with a reagent such as a radical initiator, adding a predetermined modifying agent and stirring the mixture at a predetermined temperature for a predetermined time. In this manner, a polymer mixture having a modified polymer can be prepared. In the present invention, it is preferable that a main chain of a polymer is modified.

In the modification reaction, for satisfactory modification, the added amount of the modifying agent is preferably not less than 0.001 part by mass, more preferably not less than 1 part by mass and is preferably not more than 200 parts by mass, more preferably not more than 50 parts by mass, further preferably not more than 10 parts by mass, based on 100 parts by mass of the polymer.

The temperature and time for the modification reaction can be appropriately set but typically, the temperature is 0 to 50° C. (preferably 20 to 40° C.) and the time is 5 minutes to 6 hours. The stirring method is not limited particularly and may be a known method. Typically, in order to terminate the polymerization reaction after modification, water, alcohol, acid and the like are added. Moreover, a known anti-aging agent may be added as necessary. The mixture obtained in this manner is dried and a polymer mixture can be obtained.

Examples of the polymer mixture obtained as described above include a modified polymer having a modified group represented by the following formula (1) which is derived from the modifying agent (compound having at least one of an ester group and a carboxyl group), and a multimer such as a dimer or trimer of the modified polymer, the formula (1) being:

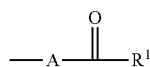
(1)

wherein A represents a single bond or a divalent saturated or unsaturated hydrocarbon group; $R^1$ represents $OR^4$ or a group represented by the following formula (2); and $R^4$ represents a hydrogen atom or a monovalent saturated or unsaturated hydrocarbon group, the formula (2) being:

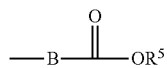
(2)

wherein B represents a divalent saturated or unsaturated hydrocarbon group; and $R^5$ represents a hydrogen atom or a monovalent saturated or unsaturated hydrocarbon group.

A is not limited particularly as long as it is a single bond or a divalent saturated or unsaturated hydrocarbon group and examples thereof include a linear, branched or cyclic alkylene group, alkenylene group, arylene group and the like. Among these, since excellent energy efficiency and abrasion resistance can be obtained, a group represented by the following formula (3) is preferable, the formula (3) being:

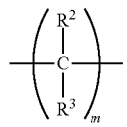
(3)

wherein m represents an integer of 0 to 6; and $R^2$ and $R^3$ are the same as or different from each other, each representing a hydrogen atom, a $C_{1-2}$ hydrocarbon group, or an aryl group.

In the formula, m represents an integer of 0 to 6, preferably an integer of 0 to 2.

Examples of the $C_{1-2}$ hydrocarbon group for $R^2$ and $R^3$ include a methyl group, an ethyl group and the like.

Examples of the aryl group for $R^2$ and $R^3$ include a phenyl group, a benzyl group and the like.

The monovalent saturated or unsaturated hydrocarbon group for $R^4$ is not limited particularly, and examples thereof include a linear, branched or cyclic alkyl group, alkenyl group, aryl group and the like. Among these, a $C_{1-16}$ hydrocarbon group is preferable, and examples thereof include an alkyl group such as a methyl group, an ethyl group, a propyl group, a butyl group, a pentyl group, a hexyl group, a heptyl group, an octyl group, a decyl group, a dodecyl group, a hexadecyl group and the like; and an aryl group such as a phenyl group, a benzyl group and the like.

B is not limited particularly as long as it is a divalent saturated or unsaturated hydrocarbon group and examples thereof include those as mentioned for A. Among these, a group represented by any of the following formulas (4) to (7) is preferable, a group represented by the formula (5) or (7) is more preferable and a group represented by the formula (5) is further preferable, the formulas (4) to (7) being:

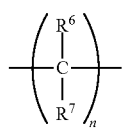
(4)

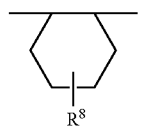
(5)

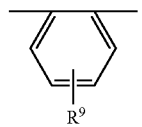
(6)

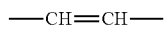
(7)

wherein n represents an integer of 2 or 3; $R^6$ and $R^7$ are the same as or different from each other and each represents a hydrogen atom or a $C_{1-18}$ hydrocarbon group; $R^8$ represents a hydrogen atom or a methyl group; and $R^9$ represents a hydrogen atom or a $C_{1-4}$ hydrocarbon group.

Examples of the $C_{1-18}$ hydrocarbon group for $R^6$ and $R^7$ include an alkyl group such as a methyl group, an ethyl group, a propyl group, a butyl group, a pentyl group, a hexyl group, a heptyl group, an octyl group, a decyl group, a dodecyl group, a hexadecyl group and the like; and an aryl group such as a phenyl group, a benzyl group and the like.

$R^8$ is preferably a methyl group.

Examples of the $C_{1-4}$ hydrocarbon group for $R^9$ include a methyl group, an ethyl group, a propyl group, a butyl group and the like.

The monovalent saturated or unsaturated hydrocarbon group for $R^5$ is not limited particularly and examples thereof include hydrocarbon groups as mentioned for $R^4$, for example, a $C_{1-6}$ hydrocarbon group such as a methyl group, an ethyl group, a propyl group, a butyl group, a pentyl group, a hexyl group and the like. $R^5$ is preferably a hydrogen atom.

For example, when methyl cyanoformate is used as a modifying agent (compound having at least one of an ester group and a carboxyl group), a modified polymer having a modified group as represented by the following formula (8) can be obtained. When each of t-butyl acrylate, 4-methylcyclohexane-1,2-dicarboxylic anhydride and maleic anhydride is used, a modified polymer having a modified group as represented by the following formula (9), the following formulas (10) and (11) and the following formula (12) can be obtained, respectively. It is noted that in the following formulas, E represents a residual part, which is a part derived by excluding the part of the modified group from the modified polymer composed of at least one of a conjugated diene component and an aromatic vinyl compound.

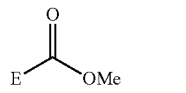

(8)

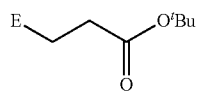

(9)

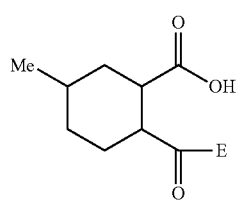

(10)

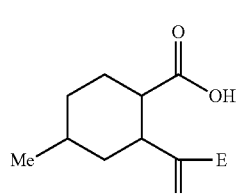

(11)

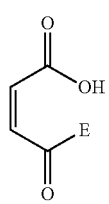

(12)

The polymer mixture obtained as described above preferably comprises a modified group in an amount of not less than 0.1 group on average per molecule of a polymer constituting the polymer mixture, that is, in which not less than 10% of the polymer constituting the polymer mixture is modified with the above-mentioned compound. It is noted that the average number of modified groups (amount of modified groups) per molecule of a polymer herein is measured by the method described later in the Examples.

The weight-average molecular weight (Mw) of the polymer mixture is not less than $1.0\times10^3$, and is preferably not less than $2.0\times10^3$, further preferably not less than $4.0\times10^3$. If the Mw is less than $1.0\times10^3$, there is a tendency that not only a large hysteresis loss which makes it difficult to achieve sufficient fuel efficiency arises, but also abrasion resistance is deteriorated and additionally a bleed out arises. The Mw is not more than $1.0\times10^5$, and is preferably not more than $1.0\times10^4$, further preferably not more than $6.0\times10^3$. If the Mw is more than $1.0\times10^5$, deterioration of processability becomes a concern. It is noted that the weight-average molecular weight (Mw) herein is measured by the method described later in the Examples.

The styrene content in the polymer mixture is preferably not less than 5% by mass, more preferably not less than 10% by mass. If the styrene content is less than 5% by mass, sufficient grip performance may not be obtained. On the other hand, the styrene content is preferably not more than 45% by mass, more preferably not more than 35% by mass. If the styrene content is more than 45% by mass, energy efficiency tends to be deteriorated. It is noted that the styrene content herein is measured by the method described later in the Examples.

The content of the polymer mixture based on 100 parts by mass of a rubber component is preferably not less than 0.5 part by mass, more preferably not less than 3 parts by mass, further preferably not less than 10 parts by mass. On the other hand, the content is preferably not more than 100 parts by mass, more preferably not more than 25 parts by mass. If the content of the polymer mixture is less than 0.5 part by mass, energy efficiency and abrasion resistance may not be improved sufficiently. If the content is more than 100 parts by mass, there is a tendency that a bleed out arises and additionally the cost is increased.

(Rubber Component)

Examples of the rubber component which can be used in the present invention include diene rubbers such as a natural rubber (NR), an isoprene rubber (IR), a butadiene rubber (BR), a styrene-butadiene rubber (SBR), an acrylonitrile-butadiene rubber (NBR), a chloroprene rubber (CR), a butyl rubber (IIR), a styrene-isoprene-butadiene copolymer rubber (SIBR) and the like. Among these, since grip performance and abrasion resistance can be obtained in a favorable balance, it is preferable to use NR, BR and SBR and it is more preferable to use SBR. Additionally, the combined uses of NR and SBR, BR and SBR, and NR, BR, and SBR are also preferable.

The SBR is not limited particularly and for example, an emulsion polymerized styrene-butadiene rubber (E-SBR), a solution polymerized styrene-butadiene rubber (S-SBR) and the like may be used. Among these, the S-SBR is preferable since energy efficiency and abrasion resistance can be successfully improved.

The styrene content of the SBR is preferably not less than 10% by mass, more preferably not less than 15% by mass. On the other hand, the styrene content is preferably not more than 50% by mass, more preferably not more than 30% by mass. When the styrene content is within the above range, satisfactory energy efficiency and abrasion resistance can be obtained. It is noted that the styrene content herein is measured in the same manner as the method described later in the Examples.

The content of the SBR based on 100% by mass of the rubber component is preferably not less than 80% by mass, more preferably not less than 90% by mass, further preferably 100% by mass, since energy efficiency and abrasion resistance can be obtained in a favorable balance.

(Triamines)

A compound represented by the following formula (I) may be used as triamines, the formula (I) being:

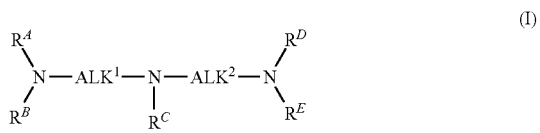

(I)

wherein each of $R^A$, $R^B$, $R^C$, $R^D$ and $R^E$ independently represents a hydrogen atom or an alkyl group, and each of $ALK^1$ and $ALK^2$ independently represents an alkylene group. These may be used alone or in combination of two or more.

In the above, the alkyl group refers to both a linear alkyl group and a branched alkyl group, and is preferably a $C_{1-6}$ alkyl group, more preferably a $C_{1-4}$ alkyl group, further preferably a $C_1$ alkyl group. The alkylene group refers to both a linear alkylene group and a branched alkylene group, and is preferably a $C_{1-12}$ alkylene group, more preferably a $C_{3-9}$ alkylene group, further preferably a $C_{5-7}$ alkylene group.

In the triamines (I), each of $R^A$, $R^B$, $R^C$, $R^D$ and $R^E$ is preferably a hydrogen atom.

A specific example of the triamines (I) is bis(hexamethylene)triamine and the like.

The content of the triamines (I) based on 100 parts by mass of the rubber component is preferably not less than 0.1 part by mass, more preferably not less than 0.5 part by mass, further preferably not less than 1.0 part by mass. If the content is less than 0.1 part by mass, there is a tendency that a vulcanization speed is slow and processability in a vulcanization process is deteriorated. On the other hand, the content is preferably not more than 20 parts by mass, more preferably not more than 10 parts by mass. If the content is more than 20 parts by mass, there is a tendency that a vulcanization speed becomes too fast and processability in an extruding process is deteriorated.

(Silica)

Examples of the silica include silica prepared by dry process (silicic anhydride), silica prepared by wet process (hydrous silicic acid) and the like. The silica prepared by wet process is preferable because it has more silanol groups.

The nitrogen adsorption specific surface area ($N_2SA$) of the silica is preferably not less than 50 m²/g, more preferably not less than 80 m²/g, further preferably not less than 150 m²/g. If the $N_2SA$ is less than 50 m²/g, there is a tendency that a reinforcing effect is small and sufficient abrasion resistance is not obtained. On the other hand, the $N_2SA$ is preferably not more than 300 m²/g, more preferably not more than 250 m²/g, further preferably not more than 200 m²/g. If the $N_2SA$ is more than 300 m²/g, there is a tendency that dispersibility of silica is not satisfactory, a hysteresis loss is increased and energy efficiency is deteriorated. It is noted that the $N_2SA$ of the silica herein is measured by the BET method in accordance with ASTM D3037-93.

The content of the silica based on 100 parts by mass of the rubber component is preferably not less than 5 parts by mass, more preferably not less than 15 parts by mass, further preferably not less than 30 parts by mass. If the content is less than 5 parts by mass, there is a tendency that reinforcing effect is small and consequently sufficient bending fatigue resistance and abrasion resistance are hardly obtained. On the other hand, the content is preferably not more than 150 parts by mass, more preferably not more than 100 parts by mass, further preferably not more than 70 parts by mass. If the content is more than 150 parts by mass, there is a tendency that processability and dispersibility are not satisfactory and abrasion resistance is deteriorated.

(Silane Coupling Agent)

It is preferable that the rubber composition of the present invention comprises a silane coupling agent together with silica. Examples of the silane coupling agent include sulfide silane coupling agents, mercapto silane coupling agents, vinyl silane coupling agents, amino silane coupling agents, glycidoxy silane coupling agents, nitro silane coupling agents, chloro silane coupling agents and the like. Among these, from the viewpoint of the effect of improving reinforcing property and the like, bis(3-triethoxysilylpropyl) disulfide, bis(3-triethoxysilylpropyl)tetrasulfide and 3-trimethoxysilylpropylbenzothiazolyl tetrasulfide are preferable. The content of the silane coupling agent based on 100 parts by mass of silica is preferably not less than 1 part by mass, more preferably not less than 4 parts by mass. If the content is less than 1 part by mass, there is a tendency that viscosity of an unvulcanized rubber composition becomes high and processability is deteriorated. On the other hand, the content is preferably not more than 20 parts by mass, more preferably not more than 12 parts by mass. If the content is more than 20 parts by mass, there is a tendency that the blending effect of the silane coupling agent that is compatible with the blended amount is not obtained and the cost is increased.

(Other Compounding Agents)

The rubber composition of the present invention can appropriately comprise, in addition to the above components, compounding agents generally used in a production of a rubber composition and examples thereof include carbon black, various anti-aging agents, a stearic acid, a zinc oxide, a vulcanization agent, a vulcanization accelerator, oil and the like.

The content of oil based on 100 parts by mass of the rubber component is preferably not more than 5 parts by mass, more preferably not more than 1 part by mass and the rubber composition of the present invention may not comprise oil.

(Production of Rubber Composition)

The rubber composition of the present invention may be produced by a commonly used method. That is, the rubber composition of the present invention can be prepared by kneading the above components with a Bunbury mixer, a kneader, an open roll and the like, followed by vulcanization. The rubber composition of the present invention can be suitably used for various components of a tire and since contribution to energy efficiency is great, it is preferably used for a tread and a sidewall and since contribution to abrasion resistance is great, it is further preferably used for a tread.

<Pneumatic Tire>

The pneumatic tire of the present invention may be produced by a commonly used method with the above rubber composition. That is, a rubber composition compounding the above components is molded by extrusion into the shape of various components of a tire in an unvulcanized state, assembled on a tire building machine with other tire components to form an unvulcanized tire by a commonly used method. This unvulcanized tire is then heat-pressurized in a vulcanizer to obtain a tire. The obtained tire is blown up to obtain a pneumatic tire.

EXAMPLE

The present invention is described in detail by means of Examples, but is not limited to the Examples.

Production Example

The chemicals used for a synthesis and polymerization are listed below. The chemicals were refined by conventional methods, if necessary.

n-Hexane: product from KANTO CHEMICAL CO., INC.
1,3-Butadiene: product from Takachiho Chemical Industrial Co., Ltd. Styrene: product from KANTO CHEMICAL CO., INC.
TMEDA: tetramethylethylenediamine manufactured by KANTO CHEMICAL CO., INC.
1.6 M BuLi: 1.6 M n-butyllithium in hexane manufactured by KANTO CHEMICAL CO., INC.
2,6-Di-t-butyl-p-cresol: product from Ouchi Shinko Chemical Industrial Co., Ltd.
AIBN: 2,2'-azobis(isobutyronitrile)
Modifying agent (1): maleic anhydride manufactured by Tokyo Chemical Industry Co., Ltd.

Production Example 1 (Synthesis of Polymers (1) to (4))

A 3-L autoclave with a stirrer was sufficiently purged with nitrogen and then charged with n-hexane, 1,3-butadiene, styrene, and tetramethylethylenediamine according to the formulation shown in Table 1, and the temperature in the autoclave was adjusted to 25° C. Then, 1.6 M n-butyllithium in hexane was added to the autoclave and the mixture was polymerized under a condition of an elevated temperature (30° C.) for 60 minutes until the conversion ratio of monomers was confirmed to be 99%. After that, the obtained reaction solution was treated with methanol and thereto was added 1.5 g of 2,6-di-t-butyl-p-cresol as an anti-aging agent, followed by drying to obtain the polymers (styrene-butadiene copolymers) (1) to (4).

Production Example 2 (Synthesis of Polymer Mixtures (1) to (12))

According to the formulation shown in Table 2, each of the obtained polymers (1) to (4), n-hexane, and AIBN are added to a flask, and the temperature in the flask was adjusted to 60° C. Then, the modifying agent (1) (maleic anhydride) was added to the flask and the mixture was stirred for an hour. The obtained reaction solution was treated with methanol and thereto was added 1.5 g of 2,6-di-t-butyl-p-cresol as an anti-aging agent, followed by drying to obtain the polymer mixtures (modified styrene-butadiene copolymers) (1) to (12).

The following evaluations were performed with respect to the obtained polymers and polymer mixtures. The results are shown in Tables 1 and 2.
(Measurement of Styrene Content)
A $^1$H-NMR was measured at 25° C. with a JEOL JNM-A 400NMR device. From the resulting spectrum, the ratio of the amount of phenyl protons from the styrene unit at 6.5 to 7.2 ppm to the amount of vinyl protons from the butadiene unit at 4.9 to 5.4 ppm was determined and the styrene content was determined from the ratio.
(Measurement of Weight-Average Molecular Weight Mw)
The weight average molecular weight Mw was determined with a gel permeation chromatograph (GPC) (GPC-8000 series manufactured by Tosoh Corporation; detector: differential refractometer; column: TSKGEL SUPERMULTIPORE HZ-M manufactured by Tosoh Corporation) and calibrated with polystyrene standards.
(Measurement of Amount of Modified Groups)
Measurement of Amount of Modified Groups Per Molecule: Titration Test
Sample: Polymer Mixtures (1) to (12)
An amount of 0.1 g of KOH was weighed and added to a measuring flask of 100 mL, and thereto was filled MeOH to the marked line to prepare a KOH solution. Then, 0.5 g of a sample was weighed and dissolved in 30 mL of toluene. To the prepared sample solution was added one drop of phenolphthalein, and then the previously prepared KOH solution was added dropwise to the solution to carry out a titration test. An acid concentration determined by calculation was defined as the amount of modified groups.

Production Example 1

TABLE 1

| Polymer | (1) | (2) | (3) | (4) |
|---|---|---|---|---|
| Compounded amount | | | | |
| Styrene (g) | 31 | 18 | 12 | 12 |
| 1,3-butadiene (g) | 46 | 55 | 68 | 68 |
| TMEDA (g) | 1.6 | 1.6 | 1.2 | 0.2 |
| 1.6M BuLi (mL) | 23 | 23 | 16.6 | 2.8 |
| n-Hexane (mL) | 1,500 | 1,500 | 1,500 | 1,500 |
| Evaluation | | | | |
| Styrene content (% by mass) | 40.3 | 24.7 | 15 | 14.8 |
| weight-average molecular weight | 5,000 | 5,000 | 5,000 | 30,000 |

Production Example 2

TABLE 2

| Compounded amount | Polymer mixture | | | | | | | | | | | |
| | (1) | (2) | (3) | (4) | (5) | (6) | (7) | (8) | (9) | (10) | (11) | (12) |
|---|---|---|---|---|---|---|---|---|---|---|---|---|
| Polymer (1) (g) | 100 | 100 | 100 | — | — | — | — | — | — | — | — | — |
| Polymer (2) (g) | — | — | — | 100 | 100 | 100 | — | — | — | — | — | — |
| Polymer (3) (g) | — | — | — | — | — | — | 100 | 100 | 100 | — | — | — |
| Polymer (4) (g) | — | — | — | — | — | — | — | — | — | 100 | 100 | 100 |
| AIBN (g) | 2.46 | 4.92 | 14.77 | 2.46 | 4.92 | 14.77 | 2.46 | 4.92 | 14.77 | 2.46 | 4.92 | 14.77 |
| n-Hexane (mL) | 500 | 500 | 500 | 500 | 500 | 500 | 500 | 500 | 500 | 500 | 500 | 500 |
| Modifying agent (1) (g) | 1.03 | 2.06 | 6.18 | 1.03 | 2.06 | 6.18 | 1.03 | 2.06 | 6.18 | 1.03 | 2.06 | 6.18 |
| Amount of modified groups per molecule (number) | 0.5 | 1 | 3 | 0.5 | 1 | 3 | 0.5 | 1 | 3 | 0.5 | 1 | 3 |

Examples and Comparative Examples

A variety of chemicals used in Examples and Comparative Examples will be described.

SBR: NS 116 (styrene content: 22% by mass, vinyl content: 65% by mass) manufactured by ZEON Corporation Silica: Ultrasil VN3 (N$_2$SA: 175 m$^2$/g) manufactured by Evonik Degussa GmbH
Silane coupling agent: Si266 (bis(3-triethoxysilylpropyl)disulfide) manufactured by Evonik Degussa GmBH
Zinc oxide: zinc oxide #1 manufactured by Mitsui Mining and Smelting Co., Ltd.
Stearic acid: Stearic acid "Tsubaki" manufactured by NOF CORPORATION
Anti-aging agent: Antigene 6C (N-(1,3-dimethylbutyl)-N'-phenyl-p-phenylenediamine) manufactured by Sumitomo Chemical Co., Ltd.
Sulfur: sulfur powder manufactured by TSURUMI CHEMICAL INDUSTRY CO., LTD.
Vulcanization accelerator (1): Nocceler NS (N-tert-butyl-2-benzothiazolylsulfeneamide) manufactured by OUCHI SHINKO CHEMICAL INDUSTRIAL CO., LTD.
Vulcanization accelerator (2): Nocceler D (N,N'-diphenylguanidine) manufactured by OUCHI SHINKO CHEMICAL INDUSTRIAL CO., LTD.
Polymers (1) to (3): polymers synthesized in the Production Example 1 Polymer mixtures (1) to (12): polymer mixtures synthesized in the Production Example 2
Triamines (1): bis(hexamethylene)triamine manufactured by Tokyo Chemical Industry Co., Ltd.

According to the formulation shown in Table 3, all of the chemicals other than sulfur and vulcanization accelerators were kneaded in a 1.7 L Banbury mixer to obtain a kneaded product. Then, the sulfur and vulcanization accelerators were added to the obtained kneaded product and the mixture was kneaded with an open roll to obtain an unvulcanized rubber composition. The obtained unvulcanized rubber composition was press-vulcanized at 170° C. for 15 minutes to obtain a vulcanized product. Moreover, the obtained unvulcanized rubber composition was molded into the shape of a tread, assembled with other tire components into an unvulcanized tire, which was then press-vulcanized for 10 minutes under a condition of 170° C. to produce a test tire (tire size: 195/65R15). The obtained vulcanized products and test tires were evaluated as follows and the results are shown in Table 3.

(Abrasion Resistance Index)

The Lambourn abrasion amount was measured with a Lambourn abrasion testing machine under a condition of a temperature of 20° C., a slipping rate of 20% and a testing time of 2 minutes. Further, the volume loss was calculated from the measured Lambourn abrasion amount and the volume loss of each compound (vulcanized product) was shown with an index by the following calculation formula, regarding the volume loss of Comparative Example 1 as 100. The larger the Lambourn abrasion index is, the more excellent the abrasion resistance is.

(Abrasion resistance index)=(Volume loss of Comparative Example 1)/(Volume loss of each compound)×100

(Energy Efficiency Index (1))

The loss tangent (tan δ) of each compound (vulcanized product) was measured under a condition at a temperature of 70° C., an initial strain of 10%, a dynamic strain of 2%, and a frequency of 10 Hz, using a viscoelastic spectrometer VES (manufactured by Iwamoto Seisakusyo K.K.), and shown with an index by the following calculation formula, regarding the loss tangent (tan δ) of Comparative Example 1 as 100. The larger the index is, the more excellent the energy efficiency is.

(Energy efficiency index (1))=(tan δ of Comparative Example 1)/(tan δ of each compound)×100

(Energy Efficiency Index (2))

The rolling resistance of each of the obtained test tires when each test tire was run under a condition of a rim of 15×6JJ, an inner pressure of the tire of 230 kPa, a load of 3.43 kN and a speed of 80 km/h was measured with a rolling resistance testing machine and the rolling resistance of each compound is shown with an index by the following calculation formula, regarding the rolling resistance of Comparative Example 1 as 100. The larger the index is, the less the rolling resistance is and the more excellent the energy efficiency is.

(Energy efficiency index (2))=(rolling resistance of Comparative Example 1)/(rolling resistance of each compound)×100

TABLE 3

|  | Comparative Example | | | | Example | | | | |
| --- | --- | --- | --- | --- | --- | --- | --- | --- | --- |
|  | 1 | 2 | 3 | 4 | 1 | 2 | 3 | 4 | 5 |
| Compounded amount (part by mass) | | | | | | | | | |
| SBR | 100 | 100 | 100 | 100 | 100 | 100 | 100 | 100 | 100 |
| Silica | 50 | 50 | 50 | 50 | 50 | 50 | 50 | 50 | 50 |
| Silane coupling agent | 4 | 4 | 4 | 4 | 4 | 4 | 4 | 4 | 4 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Anti-aging agent | 1.5 | 1.5 | 1.5 | 1.5 | 1.5 | 1.5 | 1.5 | 1.5 | 1.5 |
| Sulfur | 1.2 | 1.2 | 1.2 | 1.2 | 1.2 | 1.2 | 1.2 | 1.2 | 1.2 |
| Vulcanization accelerator (1) | 0.5 | 0.5 | 0.5 | 0.5 | 0.5 | 0.5 | 0.5 | 0.5 | 0.5 |
| Vulcanization accelerator (2) | 0.75 | 0.75 | 0.75 | 0.75 | 0.75 | 0.75 | 0.75 | 0.75 | 0.75 |
| Polymer (1) | 20 | — | — | — | — | — | — | — | — |
| Polymer (2) | — | 20 | — | — | — | — | — | — | — |
| Polymer (3) | — | — | 20 | 20 | — | — | — | — | — |
| Polymer mixture (1) | — | — | — | — | 20 | — | — | — | — |
| Polymer mixture (2) | — | — | — | — | — | 20 | — | — | — |
| Polymer mixture (3) | — | — | — | — | — | — | 20 | — | — |
| Polymer mixture (4) | — | — | — | — | — | — | — | 20 | — |
| Polymer mixture (5) | — | — | — | — | — | — | — | — | 20 |
| Polymer mixture (6) | — | — | — | — | — | — | — | — | — |
| Polymer mixture (7) | — | — | — | — | — | — | — | — | — |
| Polymer mixture (8) | — | — | — | — | — | — | — | — | — |
| Polymer mixture (9) | — | — | — | — | — | — | — | — | — |
| Polymer mixture (10) | — | — | — | — | — | — | — | — | — |
| Polymer mixture (11) | — | — | — | — | — | — | — | — | — |

TABLE 3-continued

|  |  |  |  |  |  |  |  |  |
|---|---|---|---|---|---|---|---|---|
| Polymer mixture (12) | — | — | — | — | — | — | — | — | — |
| Triamines (1) | — | — | — | 1.5 | 1.5 | 3 | 9 | 1.5 | 3 |
| Evaluation |  |  |  |  |  |  |  |  |  |
| Abrasion resistance index | 100 | 98 | 97 | 106 | 121 | 130 | 117 | 129 | 123 |
| Energy efficiency index (1) | 100 | 102 | 104 | 92 | 112 | 109 | 107 | 107 | 108 |
| Energy efficiency index (2) | 100 | 103 | 105 | 91 | 110 | 108 | 113 | 106 | 111 |

|  | Example |  |  |  |  |  |  |
|---|---|---|---|---|---|---|---|
|  | 6 | 7 | 8 | 9 | 10 | 11 | 12 |
| Compounded amount (part by mass) |  |  |  |  |  |  |  |
| SBR | 100 | 100 | 100 | 100 | 100 | 100 | 100 |
| Silica | 50 | 50 | 50 | 50 | 50 | 50 | 50 |
| Silane coupling agent | 4 | 4 | 4 | 4 | 4 | 4 | 4 |
| Zinc oxide | 3 | 3 | 3 | 3 | 3 | 3 | 3 |
| Stearic acid | 2 | 2 | 2 | 2 | 2 | 2 | 2 |
| Anti-aging agent | 1.5 | 1.5 | 1.5 | 1.5 | 1.5 | 1.5 | 1.5 |
| Sulfur | 1.2 | 1.2 | 1.2 | 1.2 | 1.2 | 1.2 | 1.2 |
| Vulcanization accelerator (1) | 0.5 | 0.5 | 0.5 | 0.5 | 0.5 | 0.5 | 0.5 |
| Vulcanization accelerator (2) | 0.75 | 0.75 | 0.75 | 0.75 | 0.75 | 0.75 | 0.75 |
| Polymer (1) | — | — | — | — | — | — | — |
| Polymer (2) | — | — | — | — | — | — | — |
| Polymer (3) | — | — | — | — | — | — | — |
| Polymer mixture (1) | — | — | — | — | — | — | — |
| Polymer mixture (2) | — | — | — | — | — | — | — |
| Polymer mixture (3) | — | — | — | — | — | — | — |
| Polymer mixture (4) | — | — | — | — | — | — | — |
| Polymer mixture (5) | — | — | — | — | — | — | — |
| Polymer mixture (6) | 20 | — | — | — | — | — | — |
| Polymer mixture (7) | — | 20 | — | — | — | — | — |
| Polymer mixture (8) | — | — | 20 | — | — | — | — |
| Polymer mixture (9) | — | — | — | 20 | — | — | — |
| Polymer mixture (10) | — | — | — | — | 20 | — | — |
| Polymer mixture (11) | — | — | — | — | — | 20 | — |
| Polymer mixture (12) | — | — | — | — | — | — | 20 |
| Triamines (1) | 9 | 1.5 | 3 | 9 | 1.5 | 3 | 9 |
| Evaluation |  |  |  |  |  |  |  |
| Abrasion resistance index | 126 | 112 | 116 | 121 | 123 | 131 | 134 |
| Energy efficiency index (1) | 110 | 111 | 106 | 121 | 120 | 106 | 108 |
| Energy efficiency index (2) | 109 | 109 | 109 | 120 | 122 | 107 | 109 |

As shown in Table 3, in the Examples 1 to 12 where each of the polymer mixtures (1) to (12), one of triamines and silica are used, abrasion resistance is significantly improved and additionally, energy efficiency is maintained at a high level. On the other hand, in the Comparative Examples 1 to 3 where the unmodified polymers (1) to (3) and silica are used (No triamines is used), abrasion resistance is not improved and energy efficiency is not improved much. Moreover, even if one of triamines is added in such component (Comparative Example 4), while abrasion resistance is improved a little, energy efficiency is significantly deteriorated in reverse.

INDUSTRIAL APPLICABILITY

According to the invention, a rubber composition, in particular a rubber composition for tires which can further improve abrasion resistance without deterioration in energy efficiency, even if silica is compounded as a reinforcing filler, can be provided. The present invention can also provide a pneumatic tire using the rubber composition.

What is claimed is:
1. A rubber composition comprising:
a polymer mixture obtained by modifying a polymer composed of at least one of a conjugated diene compound and an aromatic vinyl compound with a compound having at least one of an ester group and a carboxyl group;
at least one of triamines; and
silica,
the polymer mixture having a weight-average molecular weight of $1.0 \times 10^3$ to $1.0 \times 10^5$, and
the triamines being a compound represented by the following formula (I):

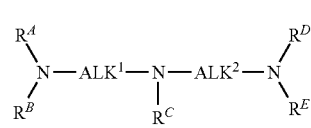

(I)

wherein each of $R^A$, $R^B$, $R^C$, $R^D$ and $R^E$ independently represents a hydrogen atom or an alkyl group, and each of $ALK^1$ and $ALK^2$ independently represents an alkylene group; and
wherein a content of the triamines is 1.0 to 20 parts by mass based on 100 parts by mass of a rubber component.

2. The rubber composition of claim 1, wherein the polymer mixture comprises a modified polymer in which a main chain is modified.

3. The rubber composition of claim 1, wherein a content of the polymer mixture is 0.5 to 100 parts by mass and a content of silica is 5 to 150 parts by mass, based on 100 parts by mass of a rubber component.

4. The rubber composition of claim 1, wherein the polymer mixture comprises a modified polymer having a modified group represented by the following formula (1):

(1)

wherein A represents a single bond or a divalent saturated or unsaturated hydrocarbon group; $R^1$ represents $OR^4$ or a group represented by the following formula (2); and $R^4$ represents a hydrogen atom or a monovalent saturated or unsaturated hydrocarbon group, the formula (2) being:

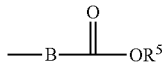
(2)

wherein B represents a divalent saturated or unsaturated hydrocarbon group; and $R^5$ represents a hydrogen atom or a monovalent saturated or unsaturated hydrocarbon group.

5. The rubber composition of claim 4, wherein the A is represented by the following formula (3):

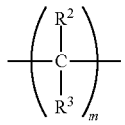
(3)

wherein m represents an integer of 0 to 6; and each of $R^2$ and $R^3$ independently represents a hydrogen atom, a $C_{1-2}$ hydrocarbon group, or an aryl group, and
the B is represented by any of the following formulas (4) to (7):

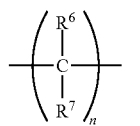
(4)

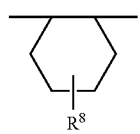
(5)

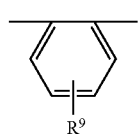
(6)

(7)

wherein n represents an integer of 2 or 3; each of $R^6$ and $R^7$ independently represents a hydrogen atom or a $C_{1-18}$ hydrocarbon group; $R^8$ represents a hydrogen atom or a methyl group; and $R^9$ represents a hydrogen atom or a $C_{1-4}$ hydrocarbon group.

6. The rubber composition of claim 1, wherein the polymer mixture comprises a modified group of not less than 0.1 group on average per molecule of a polymer constituting the polymer mixture.

7. The rubber composition of claim 1, wherein the polymer in the polymer mixture is a styrene polymer, a butadiene polymer or a styrene-butadiene polymer.

8. The rubber composition of claim 7, wherein the styrene-butadiene polymer has a styrene content of 5 to 45% by mass.

9. A rubber composition for tires composed of the rubber composition of claim 1.

10. A pneumatic tire formed from the rubber composition of claim 1.

* * * * *